United States Patent Office 3,141,730
Patented July 21, 1964

3,141,730
PRODUCTION OF POTASSIUM BICARBONATE
Ira Milton Le Baron, Evanston, Ill., assignor to International Minerals & Chemical Corporation, a corporation of New York
No Drawing. Filed Nov. 17, 1960, Ser. No. 69,841
3 Claims. (Cl. 23—64)

The present invention generally relates to the production of potassium bicarbonate. More particularly it relates to the preparation of an amine-potassium bicarbonate composition in a process in which an aqueous solution of potassium carbonate is carbonated in the presence of an amine.

Potassium carbonate ($K_2CO_3$) and potassium bicarbonate ($KHCO_3$) are well known chemicals of commerce. Potassium bicarbonate has been extensively used in baking powders and it is now being used in fire extinguisher powders. The potassium bicarbonate used in fire extinguisher powders should be relatively free flowing and should maintain the free flowing charatceristic over extended periods of time. Substantially pure potassium bicarbonate, however, has a tendency to cake and various mixtures of potassium bicarbonate with other materials have been proposed by the prior art in order to maintain the potassium bicarbonate as a free flowing material. Non-hygroscopic coatings have also been applied to potassium bicarbonate in order to prevent the caking thereof. The present invention is directed to providing a potassium bicarbonate eminently suitable for use in fire extinguisher powders, although the material may be used for other purposes.

Potassium bicarbonate may be prepared by passing carbon dioxide into an aqueous solution of a water soluble potassium compound, such as potassium carbonate, at conditions effective to produce the bicarbonate. The present invention is directed to improving the prior art carbonation processes.

Accordingly it is an object of the present invention to provide an improved relatively free flowing potassium bicarbonate product.

It is a further object of the invention to provide a potassium bicarbonate product, having relatively free flowing characteristics and which will maintain the relatively free flowing characteristics over an extended period of time, in a process in which an aqueous solution of potassium carbonate is carbonated with carbon dioxide in the presence of an amine.

These and other objects and advantages of the present invention will be apparent from the description of the invention.

Generally described, the present invention is a process for the production of potassium bicarbonate which comprises treating an aqueous solution of a water soluble potassium salt with carbon dioxide in the presence of an amine.

The present invention finds application in prior art processes in which an aqueous solution of a water soluble potassium salt is treated with carbon dioxide at conditions effective to form potassium bicarbonate and the invention generally embraces application in any of such prior art processes. The invention finds particular application in providing an improved product in prior art processes in which an aqueous solution of potassium carbonate is carbonated with carbon dioxide at conditions effective to produce the bicarbonate. These conditions which are effective to produce the bicarbonate from the carbonate are well known in the art and are generally embraced in this invention.

The present invention is based on the discovery that an improved potassium bicarbonate product is produced by the prior art carbonation processes when the carbonating is effected in the presence of an amine. It has been determined that when the carbonation is effected in the presence of an amine the resultant potassium bicarbonate is associated with the amine in a manner such that the potassium bicarbonate-amine composition is non-caking, that is the potassium bicarbonate is free flowing and maintains the free flowing characteristic over an extended period of time.

Any suitable amine may be used in the present invention. The amine must, of course, be soluble to a substantial extent in the aqueous solution at the carbonating conditions utilized. The amine preferably contains at least 4 carbon atoms in the molecule and more preferably at least 6 carbon atoms in the molecule. Free flowing potassium bicarbonate has been prepared when using primary aliphatic amines containing from about 8 to about 20 carbon atoms. The amine is preferably moderately polar. One theory, although the present invention should not unduly be limited thereto, is that the polarity of the amine causes the amine to coat the potassium bicarbonate crystals as they are formed. Amine coated potassium bicarbonate crystals prepared in accordance with the invention have remained free flowing over extended periods of time.

The invention contemplates the utilization of essentially pure amines, amine salts, mixtures of these materials, as well as mixtures containing these materials.

The amines are effective to some degree in substantially all proportions such that the relative amounts thereof do not constitute the sole essential feature of the invention. The practical upper limit of the amine used is determined to a significant extent by economical considerations including cost, and, of course, an amount of amine greater than necessary to achieve the desired free flowing properties in the potassium bicarbonate product is economically impractical. Normally the amines are employed in a minor amount effective to provide dissolved amine in the amount of from about 0.001% to about 5% by weight of the potassium carbonate in the aqueous solution.

The aqueous solution to be carbonated may be any of the solutions used in the prior art processes. As hereinbefore set forth the invention finds particular application when an aqueous solution of potassium carbonate is carbonated. The solutions are preferably concentrated and more preferably substantially saturated. Concentrated and substantially saturated aqueous solutions of potassium carbonate have been efficiently reacted with carbon dioxide in the process of the present invention. Potassium bicarbonate is substantially less water soluble than potassium carbonate and, therefore, when concentrated or saturated solutions of potassium carbonate are carbonated, potassium bicarbonate crystals form in the solution.

The aqueous solution of potassium carbonate is carbonated with any suitable carbon dioxide-containing material; preferably with a carbon dioxide-containing gas. The gas, or other material, however, of course, preferably does not contain other constituents which would react with the potassium carbonate solution at the conditions employed to form other compounds which would precipitate with the potassium bicarbonate and contaminate the potassium bicarbonate product. Substantially pure carbon dioxide may be used as well as flue gases, mixtures of carbon dioxide with air, nitrogen, carbon monoxide, etc. The gas utilized preferably contains at least 2% by volume of carbon dioxide.

The reaction between the aqueous solution of potassium carbonate with the carbon dioxide takes place at operating conditions that may be employed in the prior art process of this type. Ambient temperatures may be used although higher or lower temperatures may be used when desired. The temperature is, however, below that at which decomposition of the amine employed takes place; the temperature is, therefore, one at which the amine utilized is stable. Atmospheric pressure may be employed as well as subatmospheric and superatmospheric pressures. Superatmospheric pressures are preferred since, in general, the reaction proceeds at a faster rate at higher pressures.

In order to give a fuller understanding of the invention, but with no intention to be limited thereto, the following specific example is given.

*Example*

An aqueous solution saturated with respect to potassium carbonate was seeded with potassium bicarbonate crystals in the amount of 5% by weight of the solution. Octadecyl amine was also added to provide 0.1 lb. of amine per ton of $KHCO_3$ crop that could be produced from the solution. The solution was carbonated with a 90% air 10% $CO_2$ by volume gas mixture at ambient temperature until five pounds of $KHCO_3$ was produced. The $KHCO_3$ crystals were filtered, washed and dried in air at 90° C. for five hours. The dried crystals were ball-milled for 2 hours and then further dried for 15 hours at 105° C. in a 90% air 10% $CO_2$ atmosphere.

The product analyzed 94.5% $KHCO_3$ and 3.8% $K_2CO_3$. The product was free flowing and was suitable for use in fire extinguisher powders.

The description of the invention utilized specific reference to certain process details; however, it is to be understood that such details are illustrative only and not by way of limitation. Other modifications and equivalents of the invention will be apparent to those skilled in the art from the foregoing description.

I claim:

1. A process for the production of potassium bicarbonate which comprises treating an aqueous solution of potassium carbonate with carbon dioxide at conditions effective to form solid potassium bicarbonate in the presence of a substantially polar amine having from 4 to 20 carbon atoms.

2. The process of claim 1 wherein said amine comprises a primary aliphatic amine containing from about 8 to about 20 carbon atoms.

3. The process of claim 1 wherein said amine is provided in an amount of from about 0.001 to about 5% by weight of the potassium carbonate in the aqueous solution.

References Cited in the file of this patent

UNITED STATES PATENTS

| | | |
|---|---|---|
| 835,771 | Behrens | Nov. 13, 1906 |
| 2,480,694 | Atwood | Aug. 30, 1949 |
| 2,752,222 | Birman | June 26, 1956 |
| 2,782,093 | Hulot | Feb. 19, 1957 |
| 2,912,379 | McCracken | Nov. 10, 1959 |
| 2,927,091 | Liggett | Mar. 1, 1960 |

OTHER REFERENCES

"Chemical and Engineering News," October 5, 1959, page 52.